Sept. 25, 1956  S. M. JESSOP  2,764,251
FILTERING AND PURIFYING UNIT
Filed April 29, 1953
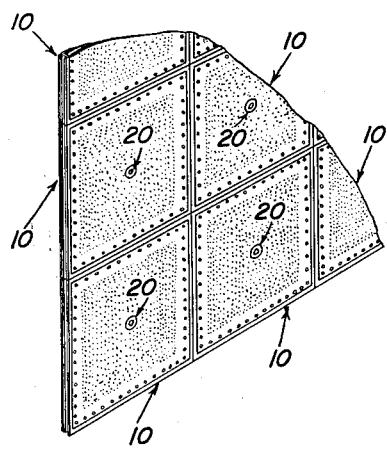
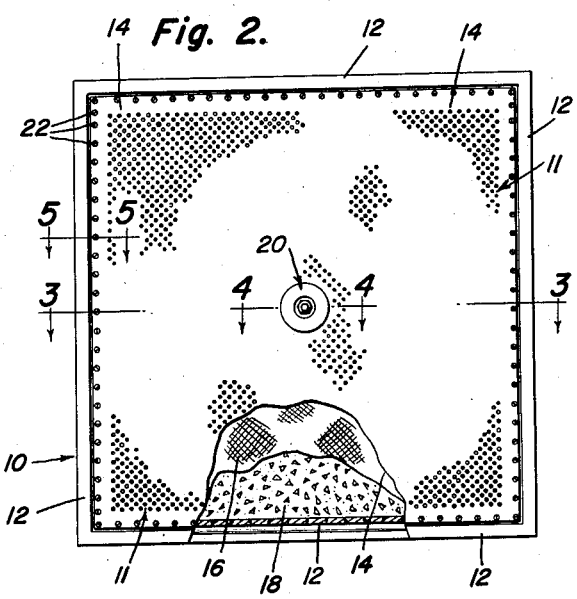
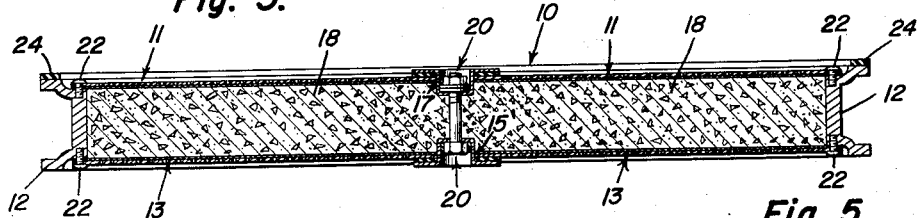
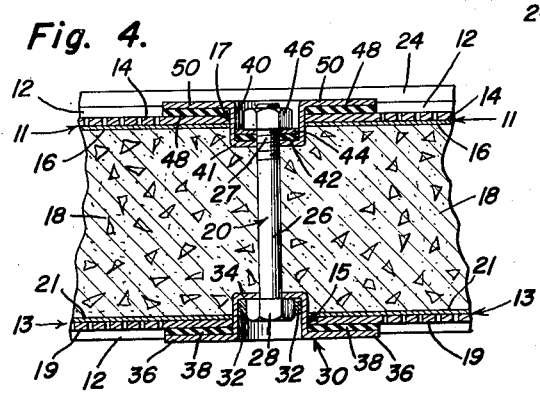
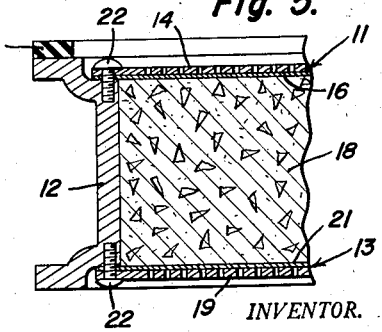
INVENTOR.
Stuart M. Jessop
BY George Renehan
ATTORNEY

United States Patent Office 2,764,251
Patented Sept. 25, 1956

2,764,251
FILTERING AND PURIFYING UNIT

Stuart M. Jessop, Baldwin, Md., assignor to the United States of America as represented by the Secretary of the Army Application April 29, 1953, Serial No. 352,067

1 Claim. (Cl. 183—4)

(Granted under Title 35, U. S. Code (1952), sec. 266)

The invention described herein may be manufactured and used by or for the Government of the United States of America for governmental purposes without the payment to me of any royalty thereon.

This invention relates to filtration and purification of fluids generally, and specifically to units for filtering and purifying large quantities of contaminated air. In the art of air filtration and purification, particularly where units of large capacity employing a granular or powdered sorbent are involved, it has been a major problem to maintain the sorbent material in a firmly packed condition to prevent the formation of channels therein. The necessity of avoiding the formation of channels in the sorbent is appreciated in this art, it being well understood that channeling results in the failure of some of the air that passes through the unit to be purified. The solution of this problem is made more difficult when it is realized that while the sorbent must be kept sufficiently packed to prevent channeling, it must not be packed so firmly as to crush the sorbent granules and thereby reduce their purifying ability and capacity.

It is an object of this invention to provide air purifying and filtering units of large capacity in which granular or powdered sorbent, such as activated charcoal, is efficiently utilized.

Another object of this invention is to provide air purifying and filtering units of large capacity that are adapted to be used in multiples for the purification of any desired quantity of air.

The above and other objects will become apparent from the following description and claim taken in combination with the accompanying drawings wherein:

Fig. 1 is a perspective view of a plurality of air purifying and filtering units disposed to form a filtering wall.

Fig. 2 is a front elevational view of one of the air purifying and filtering units, with portions broken way and shown in section.

Fig. 3 is a sectional view taken on lines 3—3 of Fig. 2.

Fig. 4 is a sectional view taken on lines 4—4 of Fig. 2.

Fig. 5 is a sectional view taken on lines 5—5 of Fig. 2.

Referring to Fig. 1, it will be seen that a plurality of air purifying and filtering units 10 are disposed to form a wall of large air purifying and filtering capacity. It should be understood that this wall may be of any size or configuration, and may constitute the side of a structure or be incorporated in any conventional manner in an air purifying and filtering system.

Fig. 2 is a front elevational view of one of the units 10, wherein it can be seen that the unit comprises a hollow frame 12 which supports a permeable, retaining wall 11 on its forward face. While the retaining wall is indicated generally by reference numeral 11, it comprises a perforated plate 14 and a fines filter 16. The frame 12 may be made of non-metal or metal, wood or aluminum being well suited; the perforated plate may be non-metal or metal, aluminum being well suited; and the fines filter may be cloth or paper. The granular sorbent 18, which may be activated charcoal or its equivalent, is housed within the frame 12 between the permeable, front wall 11, just described, and an identical, permeable wall 13, which is secured to the back of the frame 12. While permeable wall 13 cannot be seen in Fig. 2, in Figs. 3, 4 and 5 it can be seen that it comprises a perforated plate 19 and a fines filter 21. In Fig. 2 it can also be seen that the unit 10 includes a draw-bolt assembly which is indicated generally by reference numeral 20. The structure and function of this assembly will be described in great deal subsequently, but it should be noted at this point that it comprises the crux of this invention.

In Fig. 3 it will be observed that the frame 12 is channeled-shaped in cross-section, and that both of the permeable walls are secured to the frame by conventional securing means, such as studs 22 or their equivalent. The manner in which the sorbent 18 is housed within the frame and the two permeable, retaining walls can also be clearly seen. The perforations in the plates 14 and 19 are spaced a slight distance inward from the side of the plate leaving an unperforated border as shown in Figs. 2 and 5. The perforations are also spaced a slight distance outwardly from central openings 15 and 17 in plates 19 and 14 respectively as shown in Figs. 3 and 4. The formation of channels in the sorbent is likely to occur at the boundaries of the sorbent with the frame and the draw bolt assembly 20. Having an unperforated section at these points will prevent unpurified air from getting through any possible channel, since the nearest perforation would be a slight distance away from such a channel. Air entering the nearest perforation would still have to pass through the sorbent before reaching any resulting channel at the boundaries of the sorbent with the frame or draw bolt assembly. Since the sorbent is placed under compression between the plates 13 and 14 by the draw bolt assembly 20 no channeling is likely to occur at the boundary of the sorbent with the plates. It may also be observed that a gasket 24 is secured along the periphery of the frame 12 on one side for conventional purposes.

The detailed structure of the draw-bolt assembly, which is indicated generally by reference numeral 20 in Figs. 1–3, can be clearly seen in Fig. 4. A conventional, threaded bolt 26, which is herein designated a draw-bolt, has its conventional head 28 bonded to a cup-shaped washer 30 by cement 32 or its equivalent. Cup-shaped washer 30 comprises a central, cup portion 34 and an annular, flange portion 36. The draw-bolt 26 extends through opening 15 in the permeable wall 13, said opening passing through perforated plate 19 and fines filter 21, until the flange portion 36 of its attached cup-shaped washer 30 contacts the portion of the perforated plate 19 that surrounds opening 15. The cup-shaped portion 34 fits snugly within the opening 15 of the permeable wall 13 and is maintained in a sealed relationship therewith by annular gasket 38, which is positioned between the flange portion 36 of the cup-shaped washer 30 and the perforated plate 19 of the permeable wall 13. The threaded end 27 of the draw-bolt 26 extends completely through the sorbent 18 and through the opening 17 in the permeable wall 11, said opening passing through the fines filter 16 and perforated plate 14. Another cup-shaped washer 40, identical to the cup-shaped washer 30, is slipped onto the threaded end 27 of draw-bolt 26 so that its cup portion 41 is positioned in opening 17 and opposes the cup portion 34 of cup-shaped washer 30. A sealing gasket 42 and a metal washer 44 are slipped onto the threaded end 27 of the draw-bolt 26, and a nut 46 tightened thereon. The gasket 42, washer 44 and nut 46 all fit within the cup portion 41 of the cup-shaped washer 40. Annular, sealing gasket 48 is positioned between the flange portion 50 of the cup-shaped washer 40 and the portion of the perforated plate 14 that surrounds opening 17.

Referring particularly to Figs. 3 and 4, the above described structure is assembled in the following manner:

The permeable wall 13 is produced by bonding the fines filter 21 to the perforated plate 19 at their peripheries, and this assembly is secured to the lower face of the frame 12 by studs 22. The draw-bolt 26, with its cup-shaped washer 30 attached, is then inserted into and through the opening 15 in the permeable wall 13, with its threaded portion 27 extending upwardly. The frame 12, which is now open at its top, is then placed in a filling machine wherein granular charcoal is allowed to fall within the frame slowly and evenly. After the charcoal has drained into the frame 12, the frame is removed from the filling machine and placed on a level surface. The charcoal granules are gently scraped from the top of the pile of the charcoal toward the draw-bolt 26 until a crown is formed around the upper end of the draw-bolt. Then the permeable wall 11, which comprises the fines filter 16 bonded at its periphery to the perforated plate 14, is placed on top of the charcoal filled frame, its central opening 17 sliding onto the threaded end 27 of the draw-bolt, and its periphery secured to the upper face of the frame 12 by studs 22. Cup-shaped washer 40 is then slipped over the threaded end 27 of the draw-bolt 26, and the gasket 42 and washer 44 slipped thereon, and the nut 46 secured and hand tightened on said threaded end. The filled frame is then clamped in a vibrating machine for the purpose of settling and packing the charcoal. Periodically during the vibration of the charcoal-filled frame, the nut 46 is hand tightened further to cause the permeable wall 11 to closely follow the surface of the charcoal granules as they settle under the vibration, to thereby obtain the maximum possible density of sorbent. The unit is then removed from the vibrating machine and the upper end of the draw bolt cut off even with the upper surface of the unit.

Having described one air purifying and filtering unit in great detail, it should be understood that minor changes may be made which fall within the scope of the invention, for example, the units 10 may be of any reasonable shape and size, and some changes in material may also be made without touching upon the heart of the invention.

The salient feature of this invention is the draw-bolt assembly which makes it possible to maintain the sorbent under the proper amount of compression to prevent the formation of channels in the sorbent, while not being so great as to crush the granules of sorbent and thereby adversely affect their purifying ability and capacity. The draw-bolt assembly also makes it possible to periodically increase the compression on the sorbent if loosening thereof should occur.

As was noted in the objects of this invention, prior to my invention, large air filtering and purifying units were defective because of their inability to prevent channeling. My contribution to this art is the provision of air purifying and filtering units of large capacity that avoid this serious difficulty. This improvement flows directly from the use of my novel draw-bolt assembly.

I claim:

A flat filtration and purifying unit comprising an impermeable frame; a flexible permeable wall on each side of said frame cooperating therewith to form a box like structure, the distance between said permeable walls being relatively small as compared to the other dimensions of said box like structure; a sorbent consisting of closely packed discrete dry granules completely filling said box like structure; each of said walls comprising a fines filter in contact with said granules and a plate in contact with said fines filter, said plate of each wall having a central opening and having perforations spaced inwardly a distance from the sides of said plate and outwardly a distance from said central opening to deter channeling of air passing through said sorbent at the boundaries of said frame and at said central opening; and compression means drawing said permeable walls together sufficiently to maintain said sorbent under pressure, said compression means comprising two washers, each of said washers having a cup portion and an annular flange, said cup portions extending through said central opening in each of said plates, a gasket surrounding said cup portion of each of said washers and lying between said annular flange and said plate, a bolt having a head end and a threaded end and passing through said washers and said sorbent, said head end lying in said cup portion of one of said washers, a nut lying in the cup portion of the other of said washers and coupled to said bolt so that force is transmitted through said washers and said gaskets to said plates thereby compressing said sorbent between said permeable walls and preventing the formation of channels in the sorbent, and sealing means between said bolt and each of said washers.

References Cited in the file of this patent

UNITED STATES PATENTS

| | | |
|---|---|---|
| 1,655,248 | Sharp | Jan. 3, 1928 |
| 2,080,578 | Ray | May 18, 1937 |
| 2,115,946 | Eaton | May 3, 1938 |

FOREIGN PATENTS

| | | |
|---|---|---|
| 229,054 | Great Britain | Mar. 12, 1925 |